Figures 3, 5:
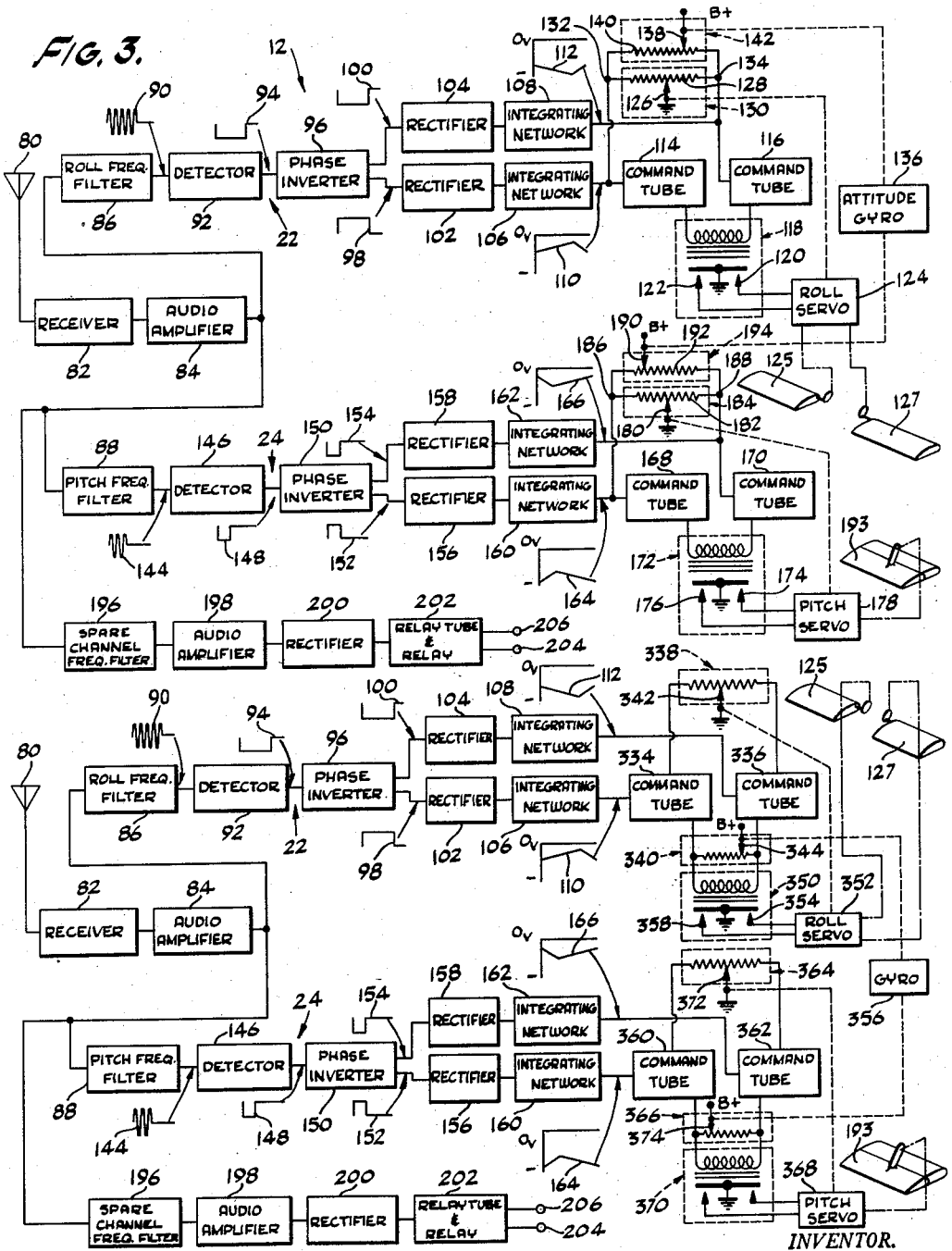

Feb. 17, 1959    B. V. DELTOUR    2,873,932
PULSE AUTOPILOT SYSTEM
Filed Sept. 23, 1952    3 Sheets-Sheet 1
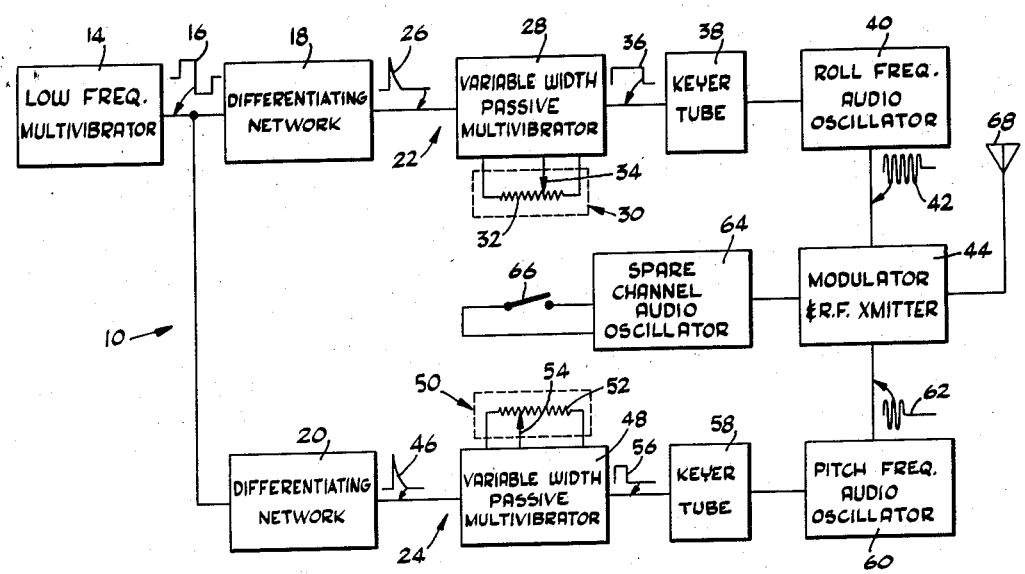
FIG. 1.
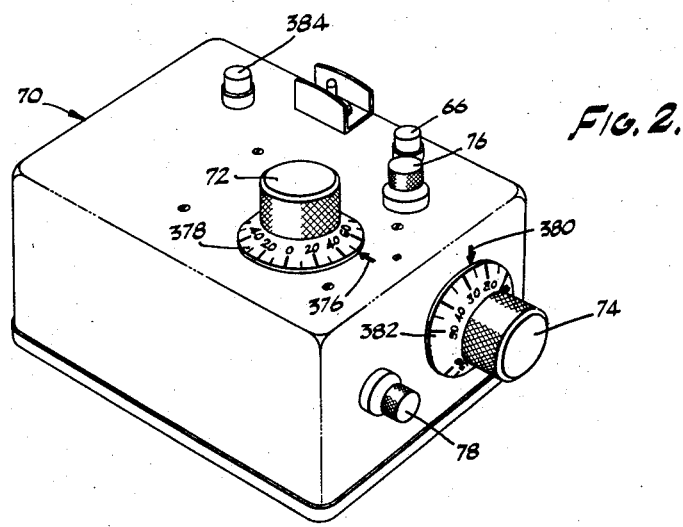
FIG. 2.
INVENTOR.
BASIL V. DELTOUR
BY
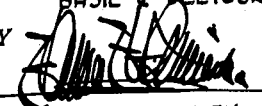
ATTORNEY Feb. 17, 1959     B. V. DELTOUR     2,873,932
PULSE AUTOPILOT SYSTEM
Filed Sept. 23, 1952     3 Sheets-Sheet 2

INVENTOR.
BASIL V. DELTOUR
BY
ATTORNEY

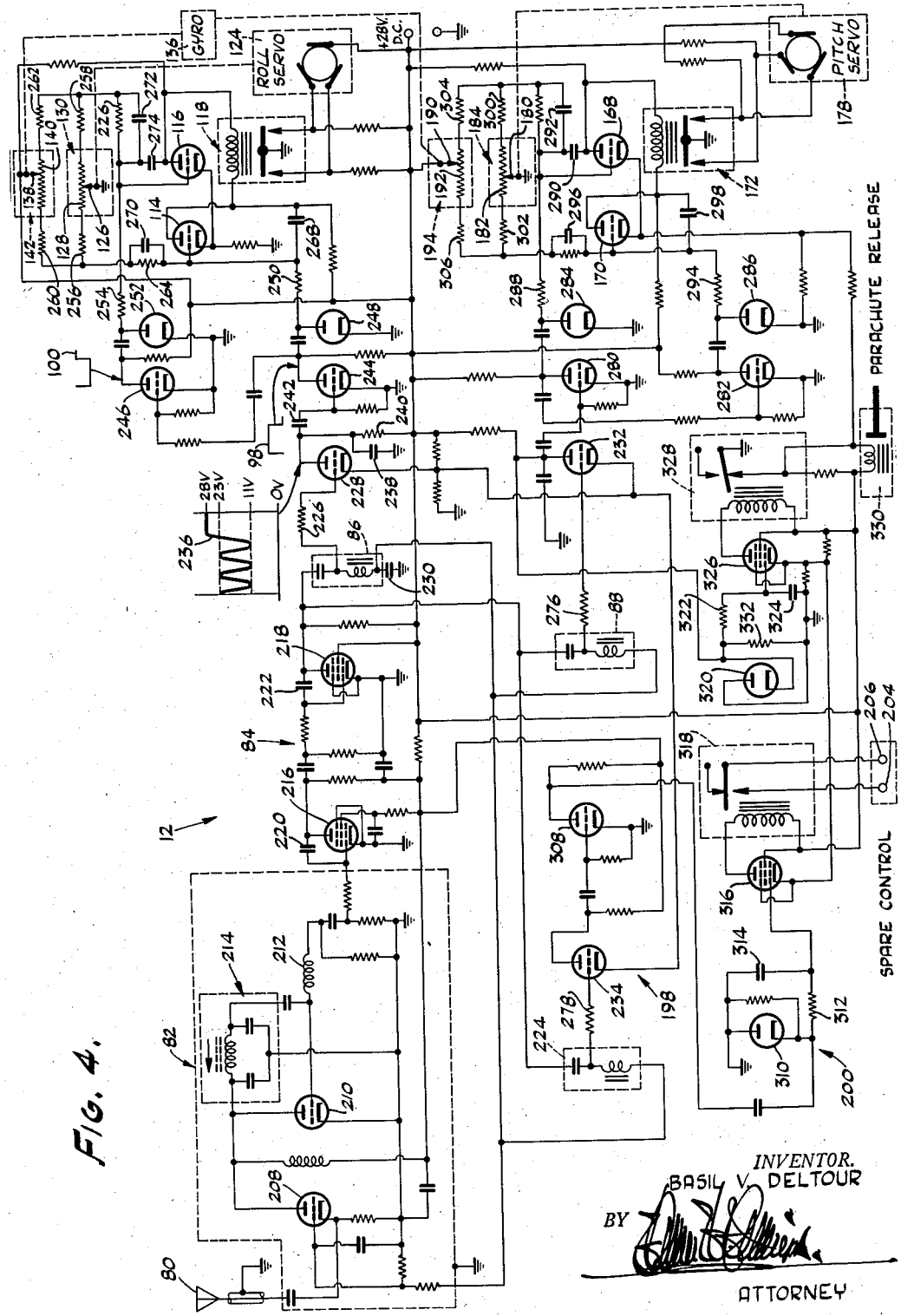

United States Patent Office 2,873,932
Patented Feb. 17, 1959

2,873,932
PULSE AUTOPILOT SYSTEM

Basil V. Deltour, Los Angeles, Calif.

Application September 23, 1952, Serial No. 311,089

21 Claims. (Cl. 244—77)

My invention relates to automatic pilot systems, and more particularly to an electronic remote control automatic pilot system.

Prior art remote control automatic pilot systems utilize a single channel of operation with a plurality of different audio frequency signals which may be selected to place an aircraft in one of a number of stepped attitudes. If it is desired to change from one attitude to the next attitude, the operator moves a control member and then must wait for a step switch to change the audio frequency and thereby change the attitude of the aircraft. No attitude between these two attitude steps could be achieved.

In these prior systems, if an attitude several steps removed from the present attitude is desired, the operator must wait for the step switch to go through a series of switching operations in order to place the aircraft in the desired attitudte, so that the new attitude could not be rapidly attained.

If the carrier wave was lost in prior art automatic pilot systems, the aircraft remained in the last commanded attitude so that the craft would crash, if the attitude did not keep it in level flight.

In view of the operational difficulties encountered in prior art stepped automatic pilot systems, it is an object of my present invention to produce a remote control automatic pilot system which permits the operator to place an aircraft in any desired attitude without being restricted to attitude steps.

Another object of my invention is to produce a remote control automatic pilot system which permits the attitude of an aircraft to be altered rapidly without the delay of a series of switching operations.

A further object of my invention is to produce a remote control automatic pilot system which returns an aircraft to level flight if the radio frequency carrier is lost.

Other objects and advantages of my invention will be apparent from the following description and claims, the novelty consisting in the features of construction, combination of parts, and the unique relations of the members and the relative proportioning, disposition and operation thereof, all as is more completely outlined herein and as is particularly pointed out in the appended claims.

In the drawings, forming a part of the present application,

Figure 1 is a block diagram of my ground control unit,
Figure 2 is a perspective view of my control box,
Figure 3 is a block diagram of my air control unit,
Figure 4 is a circuit diagram of my air control unit which is shown in block diagram in Figure 3, and
Figure 5 is a block diagram of an alternative embodiment of my air control unit.

Referring to the drawings, my pulse autopilot system includes a ground control unit 10, shown in Figure 1, and an air control unit 12, shown in Figures 3 and 4.

Referring to Figure 1, my ground control unit 10 is provided with a square wave 16 by means of a low frequency multivibrator 14. The preferred frequency for my square wave 16 is about 15 cycles per second, although other frequencies may be used.

Square wave 16 is fed into differentiating networks 18 and 20 which respectively form the first units of my roll control channel 22 and pitch control channel 24. Channels 22 and 24 include portions of both ground control unit 10 and air control unit 12.

Referring now to the portion of roll control channel 22 which forms a part of ground control unit 10, differentiating network 18 produces a positive spike 26 which has a recurrence frequency corresponding to the frequency of low frequency multivibrator 14. Positive spike 26 triggers variable width passive multivibrator 28 which is adjustable by means of potentiometer 30 connected to multivibrator 28. Movement of arm 34 of potentiometer 30 to the righ along potentiometer resistor 32 causes the output rectangular wave of variable width passive multivibrator 28 to have a relatively long positive portion and a relatively short negative portion, in a manner shown in Figure 1. Conversely, movement of arm 34 to the left along resistor 32 causes rectangular wave 36 to have a relatively short positive portion and a relatively long negative portion. Wave 36 will be a square wave with equal positive and negative portions when arm 34 is centralized along resistor 32.

Rectangular wave 36 enters keyer tube 38 which acts as a buffer to prevent reflection back to multivibrator 28 and which also supplies wave form 36 to roll frequency audio oscillator 40 with sufficient power to key off oscillator 40.

Audio oscillator 40 oscillates during the positive portion of wave 36, and is cut off during the negative portion of wave 36, so that the output of oscillator 40 is proportion modulated audio wave 42.

Wave 42 modulates a radio frequency carrier wave and this carrier wave is transmitted by means of modulator and R. F. transmitter 44.

The portion of my pitch control channel 24 which forms a part of ground control unit 10 is identical in construction to the ground control unit portion of roll control channel 22. Thus, the output of differentiating network 20 is positive spike 46 which triggers variable width passive multivibrator 48. Potentiometer 50 is associated with vultivibrator 48 and may be adjusted by moving arm 54 in either direction along potentiometer resistor 52. This permits adjustment of the relative lengths of the positive and negative portions of rectangular wave 56 which is produced by multivibrator 48. Arm 54 has been moved to the left along resistor 52 in Figure 1, so that wave 56 has a relatively short positive portion and relatively long negative portion.

Keyer tube 58 provides power to rectangular wave 56 and applies wave form 56 to the input of pitch frequency audio oscillator 60 which produces proportion modulated audio wave 62 having a short portion of pitch frequency audio oscillations and a long portion with no oscillations. Wave 62 is fed into modulator and R. F. transmitter 44 in the same manner as wave 42.

Although I have shown only two control channels, roll control channel 22 and pitch control channel 24, it is to be understood that any number of control channels utilizing different audio frequencies may be used without deviating from the scope of my invention. If an on-off control is desired instead of autopilot control, or in addition to autopilot control, I provide a spare channel audio oscillator 64 having a different frequency from audio oscillators 40 and 60, which may be turned on or off by means of a switch 66. The output of audio oscillator 64 is connected to modulator and R. F. transmitter 44, so that when switch 66 is closed spare channel audio oscillations from oscillator 64 will modulate the radio frequency carrier wave of modulator and R. F. transmitter 44 in the same manner as waves 42 and 62. When switch 66 is open, no spare channel audio oscillations will be applied to the radio frequency carrier wave.

The radio frequency carrier wave from modulator and R. F. transmitter 44, which is modulated with audio waves 42 and 62, and which may also be modulated with spare channel audio oscillations, is transmitted through antenna 68.

Referring to Figure 2 of the drawings, I provide a control box 70 for controlling ground control unit 10. Roll control knob 72 is mechanically connected to potentiometer arm 34 of multivibrator 28, so that adjustment of the position of knob 72 causes a variation in the relative lengths of the positive and negative portions of rectangular wave 36. Similarly, movement of pitch control knob 74 causes a corresponding movement of mechanically connected potentiometer arm 54 of potentiometer 50 which in turn varies the relative lengths of the positive and negative portions of rectangular wave 56.

Roll control trim knob 76 and pitch control trim knob 78 permit finer adjustments of potentiometers 30 and 50, respectively.

On-off switch 66 is also incorporated in control box 70 to facilitate the use of my spare channel.

Referring now to Figure 3 of the drawings which shows my air control unit in block diagram, the radio frequency carrier wave which was transmitted through antenna 68 is picked up by antenna 80 and conveyed to receiver 82, which may be an A. M. or an F. M. receiver according to the type of transmitter used in ground control unit 10. The output of receiver 82 is an audio signal which is amplified by audio amplifier 84, which applies the combined proportion modulated audio waves 42 and 62 to roll frequency filter 86 and pitch frequency filter 88, filters 86 and 88 respectively forming the first portions of roll control channel 22 and pitch control channel 24 which are found in air control unit 12.

Referring now to the air control unit portion of roll control channel 22, roll frequency filter 86 admits roll frequency audio oscillations and rejects all pitch frequency and extraneous frequency oscillations, so that the output of roll frequency filter 86 is proportion modulated audio wave 90 which corresponds with audio wave 42.

Square wave detector 92 which is connected to the output of roll frequency filter 86 extracts the rectangular wave from proportion modulated audio wave 90, producing rectangular wave 94. Rectangular wave 94 is similar to wave 36, but is inverted due to the phase reversal in detector 92.

Rectangular wave 94 is fed into phase inverter 96 which applies uninverted wave form 98 and inverted wave form 100, respectively, to rectifiers 102 and 104 which rectify wave forms 98 and 100 and pass them on to integrating networks 106 and 108, respectively.

Integrating networks 106 and 108 respectively produce relatively positive and negative direct current voltages 110 and 112, which are applied to the grids of a pair of command tubes 114 and 116, respectively.

Integrated wave forms 110 and 112 are not completely integrated but are direct current voltages with small triangular wave forms superimposed thereon, which provide a "dither" voltage which will be hereinafter explained.

The outputs of command tubes 114 and 116, which are preferably form the plates of tubes 114 and 116, but which may be from the cathodes, are respectively connected to opposite ends of polarized relay 118, the contacts 120 and 122 of which are operatively connected to roll servo 124. Servo 124 is mechanically coupled with ailerons 125 and 127 of an aircraft to be controlled.

If potentiometer arm 34 in Figure 1 is centralized, so that rectangular wave 36 has equal positive and negative portions, rectangular waves 94, 98 and 100 all have equal positive and negative portions, so that substantially equal direct current voltages 110 and 112 are applied to command tubes 114 and 116.

Command tubes 114 and 116 will apply substantially equal direct current voltages to the opposite ends of polarized relay 118 so that roll servo 124 will not be actuated to move the ailerons of the aircraft.

Roll servo 124 is mechanically linked to arm 126 which is slideable along resistor 128 of a servo-potentiometer 130. Since roll servo 124 is unactuated when potentiometer arm 34 in Figure 1 is centralized, arm 126 will not be moved from its central position along resistor 128 of servo-potentiometer 130 by servo 124. In this central position of arm 126, substantially equal positive potentials will be applied to the grids of command tubes 114 and 116 through connections from the respective opposite ends 132 and 134 of servo potentiometer 130.

I provide a gyroscope 136, preferably rotating about a vertical axis, which is mechanically linked to arm 138 slideably mounted along resistor 140 of a gyro-potentiometer 142. The opposite ends of gyro-potentiometer 142 are connected to ends 132 and 134 of servo-potentiometer 130. Arms 126 and 138 of potentiometers 130 and 142 are connected to ground and B-plus, respectively, so that potentiometer resistors 128 and 140 form the legs of a bridge network. When arm 34 of potentiometer 30 in Figure 1 is centralized, and roll servo 124 is unactuated, ailerons 125 and 127 of the aircraft are neutralized so that the craft will not roll in either direction. In this position of the aircraft, there is no relative displacement between gyroscope 136 and the frame of the aircraft, so that arm 138 of gyro-potentiometer 142 remains centralized on resistor 140.

When potentiometer arm 34 is moved to the right, as is shown in Figure 1, so that rectangular waves 36 and 98 have relatively long positive portions and relatively short negative portions, and rectangular waves 94 and 100 have relatively long negative portions and relatively short positive portions, integrating network 106 will apply a relatively positive voltage to command tube 114 and integrating network 108 will apply a relatively negative voltage to command tube 116. Command tubes 114 and 116 will apply a relatively negative potential to the left side of relay 118 and a relatively positive potential to the right side of relay 118 causing contact 120 of relay 118 to be made. This causes roll servo 124 to so deflect ailerons 125 and 127 that the aircraft will rotate to the right.

Rotation of roll servo 124 to move ailerons 125 and 127 so that the plane will roll to the right causes arm 126 to slide to the left along potentiometer resistance 128 of servo-potentiometer 130. This in turn causes a decrease in the potential at the left end 132 of potentiometer 130, and a corresponding increase in the potential at the right end 134 of potentiometer 130. These changes in the potentials of points 132 and 134 tend to neutralize the unequal signals from integrating networks 106 and 108 to command tubes 114 and 116, respectively.

If no other variable elements were involved, roll servo 124 would continue to rotate and to thereby further deflect ailerons 125 and 127 until arm 126 moved to the left along resistor 128 a sufficient amount to equalize the voltages at the grids of command tubes 114 and 116. This would cause the potentials at the opposite sides of polarized relay 118 to be equal so that contact 120 would be broken and roll servo 124 would stop, leaving ailerons 125 and 127 deflected.

However, as soon as the aircraft begins to roll to the right, a relative displacement occurs between gyroscope 136 and the airframe. This displacement is translated into movement of gyro-potentiometer arm 138 to the right along resistor 140 because of the mechanical linkage between arm 138 and gyroscope 136. This movement of arm 138 to the right decreases the voltage at point 132 and increases the voltage at point 134 which, together with the voltage changes at points 132 and 134 due to the positioning of arm 126 to the left along resistor 128, causes the grid of command tube 114 to be at a lower potential than the grid of command tube 116. This places a higher potential on the left end of polarized relay 118 than on the right end of relay 118 so that contact 122 is made, causing roll servo 124 to move ailerons 125 and 127 back toward their neutral positions from their previously deflected positions. This movement of roll servo 124 slides arm 126 back to the right along resistor 128 until arm 126 is centralized on resistor 128. At this point, the unequal potentials at the grids of command tubes 114 and 116 due to the displacement of arm 138 to the right along gyro-potentiometer resistor 140 is just sufficient to offset the unequal potentials at the grids of command tubes 114 and 116 due to the wave forms conveyed through integrating networks 106 and 108. Thus, equal potentials are applied to the opposite ends of relay 118 and roll servo 124 stops with ailerons 125 and 127 neutralized.

Although ailerons 125 and 127 are now undeflected the aircraft will have rolled to the right so that it will become stabilized in flight at a banked attitude. This attitude will keep a constant relative displacement between gyroscope 136 and the airframe so that arm 138 will remain to the right along resistor 140, and the attitude will be maintained if no further change is applied to arm 34 in Figure 1.

It can thus be seen that a small difference in the positive and negative portions of wave 36 will only apply a small potential difference to command tubes 114 and 116 through integrating networks 106 and 108, respectively. The bridge network will then be balanced by a relatively small movement of arm 138 to the right from its central position along resistor 140, so that the aircraft will establish an attitude at a slight bank. Gyroscope 136 will be relatively displaced from the airframe only a slight amount.

On the other hand, a large difference between the positive and negative portions of wave 36 will require a large movement of arm 138 to the right along resistor 140 to equalize the potentials at the grids of command tubes 114 and 116. This large displacement of arm 138 to the right along resistor 140 will correspond with a large relative displacement between gyroscope 136 and the airframe, so that the aircraft will be banked steeply to the right.

When potentiometer arm 34 is returned to the central position along potentiometer resistor 32 after having been moved to the right in the above manner, the output potentials of integrating networks 106 and 108 will be equal. However, since arm 138 is to the right along resistor 140, the grid of command tube 114 will be at a lower potential than the grid of command tube 116, so that a higher potential will be applied to the left side of relay 118 than to the right side thereof. This will cause contact 122 to be made so that roll servo 124 will deflect ailerons 125 and 127 to roll the aircraft to the left from its banked attitude to the right. This rotation of roll servo 124 will cause arm 126 to move to the right along resistor 128 which will tend to equalize the potentials at the grids of command tubes 114 and 116 which would stop roll servo 124 with ailerons 125 and 127 so deflected that the aircraft would continue to rotate to the left when the potentials at the grids of command tubes 114 and 116 became equalized.

However, this rotation of the aircraft to the left back toward level flight decreases the relative displacement between gyroscope 136 and the airframe so that arm 138 of gyro-potentiometer 142 is moved toward the center of resistor 140.

By the time arm 138 reaches the central position along resistor 140 which corresponds to level flight of the aircraft with no relative displacement between gyroscope 136 and the airframe, the only unbalance at the grids of tubes 114 and 116 will be caused by the deflection of arm 126 to the right along resistor 128. This will cause an increase in the potential at point 132 over the potential at point 134, causing an increase in the potential at the right end of relay 118 over the left end of relay 118 which causes contact 120 to be made. This causes roll servo 124 to return ailerons 125 and 127 to their neutral position from their previous position which tended to rotate the aircraft to the left. The mechanical linkage between roll servo 124 and arm 126 moves arm 126 to the left to its centralized position along resistor 128 as it neutralizes ailerons 125 and 127. At this time, the aircraft will be in level flight with ailerons 125 and 127 neutralized, and with arms 126 and 138 centralized along their respective resistors 128 and 140.

If potentiometer arm 34 is only partially returned to the central position from a right-hand position along resistor 32, arm 138 of gyro-potentiometer 142 will balance the signals from integrating networks 106 and 108 before arm 138 has returned all the way to the center of resistor 140. This will cause a reduction in the amount of bank of the aircraft to the right and an attitude with a lesser bank angle will be established.

The operation of my roll control channel 22 to bank the aircraft to the left when arm 34 of potentiometer 30 is moved to the left in Figure 1 is similar to the operation of my roll control channel 22 for a bank to the right, the wave forms and the movements of parts being reversed. Since my pitch control channel 24 operates in the same manner as my roll control channel 22, I have illustrated my pitch control channel 24 with potentiometer arm 54 to the left along resistor 52 of multivibrator potentiometer 50.

If rough air or other forces cause the aircraft to change its angle of bank from the commanded attitude, gyroscope 136 will cause the aircraft to return to the commanded attitude in the following manner:

If the aircraft is caused to become overbanked, the resulting increased displacement between gyroscope 136 and the airframe will cause further movement of gyro-potentiometer arm 138 to the right along resistor 140. This will cause an increase in the voltage at the input of command tube 116 and a decrease in the voltage at the input of command tube 114, which causes contact 122 of relay 118 to be made. This in turn causes roll servo 124 to deflect ailerons 125 and 127 to roll the aircraft to the left. As the craft thus rolls to the left, arm 126 of servo-potentiometer 130 is moved to the right along resistor 128, increasing the voltage to command tube 114 and decreasing the voltage to command tube 116, so that polarized relay 118 is neutralized and servo 124 stops. At this time the lessened angle of bank causes gyroscope 136 to move arm 138 back to the left to the position shown in Figure 3, which creates a higher potential at the input of tube 114 than at tube 116, causing contact 120 of relay 118 to close so that servo 124 will return ailerons 125 and 127 to their neutral positions. When ailerons 125 and 127 are thus neutralized, arm 126 is centralized on resistor 128 in the position shown in Figure 3, the bridge is again balanced and the aircraft will remain in the commanded attitude.

On the other hand, if rough air or other forces cause the aircraft to become underbanked, the decrease in the displacement between gyroscope 136 and the airframe will cause arm 138 to move to the left on resistor 140. This unbalances the bridge network to cause servo 124 to deflect ailerons 125 and 127 to roll the aircraft to the right. The bridge balance is re-established by movement of arm 126 to the left on resistor 128. However, the increased angle of bank causes gyroscope 136 to return gyro-potentiometer arm 138 to the right to the position shown in Figure 3. This unbalances the bridge to cause servo 124 to neutralize ailerons 125 and 127 and at the same time to centralize arm 126 on resistor 128 to rebalance the bridge. The aircraft will then fly in the commanded attitude until the command is changed or the position of the aircraft is otherwise altered.

Referring now to the air control unit portion of my pitch control channel 24, pitch frequency filter 88 admits pitch frequency audio oscillations and rejects all roll and extraneous frequency oscillations. The output of pitch frequency filter 88 is proportion modulated audio wave 144 which corresponds to proportion modulated audio wave 62, and from which rectangular wave 148 is extracted by detector 146. Rectangular wave 148 corresponds with rectangular wave 56 in Figure 1, but is reversed in phase due to the action of detector 146.

Rectangular wave 148 is fed into phase inverter 150 which applies uninverted rectangular wave 152 and invetred rectangular wave 154 to rectifiers 156 and 158, which rectify the wave forms and pass them on to integrating networks 160 and 162, respectively. Integrating network 160 produces a relatively negative direct current voltage wave 164, with slight variations therein, and integrating network 162 produces a relatively positive direct current voltage wave 166, with slight variations therein.

Substantially direct current waves 164 and 166 are applied to the grids of command tubes 168 and 170, respectively. The output members of command tubes 168 and 170, which are preferably the plates of tubes 168 and 170, but which may be the cathodes, are connected to opposite ends of polarized relay 172 having contacts 174 and 176 that are operatively connected to pitch servo 178.

Pitch servo 178 is mechanically linked to arm 180 which is slideable in either direction along resistor 182 of servo-potentiometer 184. The left and right hand ends 186 and 188 of potentiometer resistor 182 are connected to the respective grids of command tubes 168 and 170.

Gyroscope 136 is mechanically linked to arm 190 which is slideably mounted along resistor 192 of gyro-potentiometer 194. Arm 180 is connected to ground, and arm 190 is connected to B-plus. The ends of gyro-potentiometer resistor 192 are connected to points 186 and 188, so that potentiometer resistors 182 and 192 form the legs of a bridge network.

When arm 54 of potentiometer 50 is centralized along resistor 52 in Figure 1, wave forms 56, 148, 152 and 154 will have equal positive and negative portions, so that the average direct current potential applied to command tubes 168 and 170 through integrating networks 160 and 162, respectively will be equal. This will leave relay 172 and pitch servo 178 unactuated so that elevator 193 of the aircraft will not be deflected and the aircraft will be in normal flight. At this time, arms 180 and 190 will be centralized along resistors 182 and 192, respectively.

However, if potentiometer arm 54 is moved to the left along resistor 52 in the manner shown in Figure 1, rectangular waves 56 and 152 will have relatively short positive portions and relatively long negative portions, and rectangular waves 148 and 154 will have relatively short negative portions and relatively long positive portions. This causes relatively negative wave 164 to be applied to command tube 168 and relatively positive wave 166 to be applied to command tube 170. Command tubes 168 and 170 impress a relatively positive voltage to the left side of relay 172 and a relatively negative voltage to the right side of relay 172, so that contact 176 is made and pitch servo 178 moves elevator 193 so that the aircraft will nose downward. At the same time, pitch servo 178, through its mechanical linkage with servo-potentiometer 184 will move arm 180 to the right along resistor 182 in order to re-establish a voltage equalization at the inputs of command tubes 168 and 170 to break contact 176 of relay 172 and stop pitch servo 178.

At the same time, the changed pitch of the aircraft will create a relative displacement between gyroscope 136 and the airframe, and this displacement will cause arm 190 to move to the left along resistor 192 of gyro-potentiometer 194. This left-hand movement of arm 190 increases the potential at the grid of command tube 168 and decreases the potential at the grid of command tube 170, causing contact 174 to be made and thereby causing pitch servo 178 to return elevator 193 to its neutral position.

While pitch servo 178 is thus returning elevator 193 to its neutral position, it moves arm 180 back to its centralized position along resistor 182. At this time, relay 172 will become unactuated because the voltage unbalance caused by the left-hand positioning of arm 54 on resistor 52 in Figure 1 is balanced at the grids of tubes 114 and 116 by the positioning of arm 190 to the left along resistor 192. The aircraft is now in a diving attitude which will be maintained until arm 54 is centralized along resistor 52 in Figure 1 to return the attitude to one of level flight, or until arm 54 is otherwise moved along resistor 52 to change the pitch attitude of the aircraft.

Since pitch control channel 24 operates in the same manner as roll control channel 22, movement of arm 54 to the right along resistor 52 will establish a climbing attitude.

If rough air or other forces cause a deviation of the aircraft from the commanded pitch attitude, the aircraft will be returned to the commanded pitch attitude by gyroscope 136 in the same manner that the craft is returned to its commanded bank attitude, if that attitude is disturbed.

The amount of change in the roll and pitch attitudes of the aircraft is thus substantially proportional to the amount of movement of the respective arms 34 and 54 along resistors 32 and 52 in Figure 1.

Referring now to the portion of my spare channel disposed in my air control unit 12, spare channel frequency filter 196 permits the spare channel audio oscillations to pass, and rejects all roll, pitch and extraneous frequency oscillations. The spare channel audio oscillations are amplified by audio amplifier 198 and rectified by rectifier 200 which provides the rectified spare channel audio oscillations to relay tube and relay 202. Output members 204 and 206 of relay tube and relay 202 may be connected to any device in the aircraft which is to be controlled by an on-off signal. For example, a smoke bomb may be connected to output members 204 and 206 so that the bomb will be released when switch 66 in Figure 1 is closed to provide spare channel audio oscillations to the system.

Referring to Figure 4 of the drawings, I will now describe the circuitry of my air control unit 12 which is shown in block diagram in Figure 3.

The signal sent out through antenna 68 shown in Figure 1 is picked up by my air control unit antenna 80 from which the signal is carried to the cathode of a grounded grid R. F. amplifier tube 208.

The amplified radio frequency carrier wave then passes to the plate of superregenerative detector tube 210 which applies a normal superregenerative detecting action to the carrier, the superregeneration being applied to the grid of tube 210 through tuned circuit 214.

The audio signal is taken from tube 210 through R. F. choke 212, which completes receiver 82, and is applied to the grid of first audio frequency amplifier tube 216 which amplifies the audio signal and applies it to the grid of second audio amplifier tube 218. A pair of high frequency degenerative feedback condensers 220 and 222, associated with tubes 216 and 218, respectively, prevent overloading of tube 216 and 218 by the quench frequency of superregenerative detector tube 210.

Tube 218 completes audio amplifier 84, and applies the combined audio signals to roll frequency filter 86, pitch frequency filter 88, and spare channel frequency filter 224. Roll frequency filter 86 permits the roll frequency oscillations to pass, and these oscillations are applied through equalizing resistor 226 to the grid of detector tube 228 which forms a part of detector 92 shown in Figure 3.

Current which flows from the cathode to the grid of tube 228 during the positive half-cycles of the roll frequency audio oscillations develops a voltage across condenser 230 which inter-connects each of the three filters 86, 88 and 224 to ground. This voltage across condenser 230 is used as a protective bias for pitch frequency detector tube 232 and spare channel audio amplifier tube 234 in the manner hereinafter more fully described. This voltage which is developed across condenser 230 also acts as an automatic volume control (A. V. C.) voltage for the grid of grounded grid R. F. amplifier tube 208, to prevent overloading of superregenerative detector tube 210 at high signal levels.

The operation of detector tube 228 is as follows:

During the first portion of a duty cycle when roll frequency audio oscillations are being passed through filter 86, tube 228 is saturated during the bottom portions of the audio frequency oscillations, and is cut off during the top portions of the audio oscillations. The plate of tube 228 remains below B-plus while the audio oscillations are being applied to it because of the fact that condenser 238 is being charged through plate resistor 240. For example, where B-plus is 28 volts, during the audio oscillations the plate of tube 228 will reach a maximum voltage of about 23 volts as is shown by wave form 236. During the other part-cycle when no audio oscillations pass through filter 86, tube 228 is at cut-off, the plate of tubes 228 going to B-plus, or 28 volts, because the duty cycle has a sufficiently low frequency to permit condenser 238 to charge.

Wave 236 is applied through condenser 242 to the grid of limiter tube 244, which performs both grid limiting and plate limiting actions on wave 236 in the following manner:

During the first portion of a complete duty cycle the plate voltage of tube 228 is always sufficiently low to cut off tube 244, so that the plate of tube 244 will be at B-plus. However, during the remaining portion of a complete duty cycle when tube 228 is cut off, the grid of tube 244 is at zero volts, so that tube 244 is saturated, and the plate potential of tube 244 will be much lower than B-plus, and will be at a constant value during this portion of the duty cycle. Thus, square wave 98 is produced at the plate of tube 244. Square wave 98 will have exactly the same amplitude because of the plate and grid limiting of tube 244 regardless of the amplitude of the roll frequency audio signal applied thereto.

Wave 98 is applied to the grid of phase inverter tube 246 which reverses the phase of wave 98 to produce wave 100, and which also operates to further limit the amplitude of the wave form which it receives.

Uninverted wave form 98 is applied to the plate of shunt rectifier tube 248 and then through resistor 250 to the grid of command tube 114. Similarly, inverted wave form 100 is applied to shunt rectifier tube 252 and then through resistor 254 to the grid of command tube 116. Grounding of the cathodes of rectifier tubes 248 and 252 causes pulsating negative signals to be applied to the grids of tubes 114 and 116.

In addition to the negative signals from tubes 248 and 252, the grids of command tubes 114 and 116 are provided with positive voltages from the bridge network consisting of servo-potentiometer 130, gyro-potentiometer 142 and fixed additional bridge resistors 256, 258, 260 and 262. These positive voltages provided to the grids of command tubes 114 and 116 by the bridge network are equal when potentiometer arms 126 and 138 are centralized along their respective potentiometer resistors 128 and 140.

However, when roll servo 124 moves arm 126 to the left along resistor 128, the potential at the grid of tube 114 is lowered, and the potential of the grid of tube 116 is correspondingly raised. Conversely, when arm 126 is moved to the right along resistor 128, the potential at the grid of tube 114 will be raised, and the potential at the grid of tube 116 will be lowered.

In a similar manner, when gyroscope 136 moves arm 138 to the left along resistor 140, the potential at the grid of tube 116 is lowered and the potential at the grid of tube 114 is raised, whereas movement of arm 138 to the right along resistor 140 causes a decrease in the potential at the grid of tube 114 and an increase in the potential at the grid of tube 116. Resistor 250 and resistor 264 together form a mixing circuit which combines the negative voltage from tube 248 with the positive voltage from the bridge circuit at the grid of command tube 114. Similarly, resistors 254 and 266 mix the signal from tube 252 with the signal from the right side of the bridge at the grid of command tube 116.

Integrating networks 106 and 108, shown in Figure 3, which render the outputs of direct current amplifier command tubes 114 and 116 substantially direct current at opposite ends of polarized relay 118, comprise resistor 250 coupled with condensers 268 and 270, and resistor 254 coupled with condensers 272 and 274, respectively.

Lack of infinite sensitivity of polarized relay 118 would cause a slight lag in the response of air control unit 12 to a variation of the relative lengths of the positive and negative portions of wave 36 in ground control unit 10 if it were not corrected for. For example, a voltage difference of .1 volt may be necessary across relay 118 to actuate relay 118. To eliminate this lag in response of air control unit 12, I provide integrating network circuit elements for integrating networks 106 and 108 which are of such a value that the integrated waves provided at polarized relay 118 will have an alternating current component of substantially the same amplitude as the dead zone of relay 118, e. g., .1 volt. This is a self-generated dither voltage which causes actuation of polarized relay 118, and hence movement of roll servo 124, in response to the slightest variation of either servo-potentiometer arm 126, or gyro-potentiometer arm 138. Wave forms 110 and 112 in Figure 3, which are actually inverted when they are applied to relay 118, clearly illustrate the alternating current component of the direct current voltage which is operative as a dither voltage.

This self-generated dither voltage also acts as an anticipation control by causing relay 118 to operate intermittently at the duty cycle frequency in accordance with the alternating current dither voltage when roll servo 124 and gyroscope 136 are moving the respective potentiometer arms 126 and 138 to positions that will balance the bridge network. By this means, bank servo 124 will cease to a stop whenever the bridge approaches a balanced condition, instead of moving potentiometer arm 126 beyond the balancing position, which would cause potentiometer arms 126 and 138 to move back and forth while servo 124 hunts.

I provide a second anticipation control in addition to my dither control. My bridge circuit has a sufficiently low impedance that when potentiometer arms 126 and 138 move along resistors 128 and 140, respectively, in response to a shift in the position of arm 34 of potentiometer 30 in Figure 1, the resulting voltage shift across the bridge circuit is differentiated, so that the full voltage change across the bridge is immediately applied to the grids of command tubes 114 and 116, and the ultimate positions of arms 126 and 138 are anticipated by command tubes 114 and 116.

This latter anticipation control becomes more effective with increases in the rate of motion of arms 126 and 138 along resistors 128 and 140, respectively. Alteration of the sizes of condensers 270 and 272 will change the amount of this anticipation control which is applied.

By using this latter relatively coarse anticipation control together with the fine and accurate anticipation control provided by the dither voltage, the aircraft will always assume the correct attitude without hesitation and without over-shooting the desired attitude.

Referring now to the air control unit portion of my pitch control channel 24, pitch frequency filter 88 permits the pitch frequency audio oscillations to pass and these oscillations are fed into pitch frequency detector tube 232 which operates in exactly the same manner as roll frequency detector tube 28.

A back bias is applied to the grid of roll frequency detector tube 232 by the voltage which builds up across condenser 230. This operates to completely block off any small amount of the roll frequency audio oscillations which may pass through pitch frequency filter 88. For example, if the output of roll frequency filter 86 is ten (10) volts A. C., ten (10) volts will build up across condenser 230. The peak voltage of fourteen and fourteen-hundredths (14.14) volts of this ten (10) volt A. C. roll frequency audio signal will not be applied across condenser 230 because of limiting action of equalizing resistor 226. While this roll frequency audio signal is being applied, a ten (10) volt bias is thus provided at the grid of pitch frequency detector tube 232. If a small amount of unwanted roll frequency audio signal, such as one (1) volt, passes through pitch frequency filter 88, this ten (10) volt bias will completely block such unwanted signal. However, if a normal pitch frequency audio signal of about nine (9) volts appears at the output of filter 88, this nine (9) volt signal would have a peak of about thirteen volts, which is sufficient to saturate tube 232 in spite of the ten (10) volt back bais. Equalizing resistor 276 between filter 88 and tube 232 functions in exactly the same manner with respect to pitch control channel 24, as does resistor 226 with respect to roll control channel 22. Thus, when pitch frequency audio oscillations are applied to the system, a back bias will be furnished to roll frequency detector tube 228.

Similarly, either a roll frequency audio signal or a pitch frequency audio signal will produce a back bias for spare channel audio amplifier tube 234, and spare channel audio oscillations will provide a back bias at tubes 228 and 232, spare channel equalizing resistor 278 operating in the same manner as resistors 226 and 276.

The output of pitch frequency detector tube 232 is fed to the grid of limiter tube 280, which operates in the same manner as limiter tube 244. A portion of the plate signal from limiter tube 280 is applied to phase inverter tube 282 which inverts the wave form at the plate of tube 280 and also acts as an additional limiter in the same manner as tube 280.

Shunt rectifier diodes 284 and 286 rectify the wave forms at the plates of tubes 280 and 282, respectively, and apply negative voltages to the grids of command tubes 168 and 170, respectively.

Integrating network 160, shown in Figure 3, for command tube 168 consists of resistor 288, condenser 290 and condenser 292, while integrating network 162 for command tube 170 consists of resistor 294, condenser 296 and condenser 298.

The bridge network for pitch control channel 24 includes servo-potentiometer 184, gyro-potentiometer 194 and fixed additional bridge resistors 300, 302, 304 and 306.

Command tubes 168 and 170, polarized relay 172, pitch servo 178, servo-potentiometer 184, gyroscope 136 and gyro-potentiometer 194 all operate in exactly the same manner as the corresponding elements of my roll control channel 22.

Referring now to my spare channel, filter 224 passes the spare channel oscillations through resistor 278 to audio amplifier tube 234. The signal is then further amplified by additional audio amplifier tube 308, tubes 234 and 308 forming audio amplifier 198 shown in Figure 3.

The amplified audio signal from tube 308 is then rectified by shunt rectifier tube 310 which, together with resistor 312 and condenser 314 constitute rectifier 200 shown in Figure 3. The output of rectifier 200 is a steady D. C. voltage which is applied to the control grid of relay tube 316.

Relay tube 316 is normally biased at cutoff so that it is not conducting and relay 318 does not inter-connect output members 204 and 206.

However, when a spare channel audio signal is applied to the system by closing switch 66 in Figure 1, tube 316 conducts current to close relay 318 and inter-connects output members 204 and 206. This will actuate whatever spare channel mechanism is employed, such as a smoke bomb. If it is desired, an additional servo motor may be actuated through output members 204 and 206.

I provide a parachute release system which is adapted to release a parachute whenever the pulsing in pitch control channel 24 ceases.

The plate signal of pitch detector tube 232 is rectified by shunt rectifier tube 320 which produces a pulsating positive voltage. This pulsating voltage is filtered by resistor 322 and condenser 324 to produce a steady positive direct current voltage at the control grid of relay tube 326, which therefore normally draws plate current to keep parachute relay 328 actuated so that parachute release 330 will be held fast.

Whenever the pitch frequency signal either intentionally or accidentally ceases, tube 326 will be cut off to open relay 328 and thereby release the parachute through parachute release 330. If the entire R. F. carrier wave is interrupted, this of necessity causes the pitch frequency oscillations to cease in air control unit 12, so that the parachute will be released in the same manner as if merely the pitch control oscillations ceased.

In order that merely momentary losses of the pitch frequency signal will not release the parachute, I provide a slow discharge circuit between the plate and the cathode of tube 320, consisting of resistor 322, condenser 324 and resistor 332. This causes approximately a one second time lag between the loss of the pitch frequency audio signal and the actuation of parachute release 330.

Although I have shown my parachute release mechanism as actuated by pitch control channel 24, it is to be understood that the parachute mechanism may be actuated by the loss of the audio signal in roll control channel 22, or by the loss of the signal in any additional control channels which I may provide.

Figure 5 illustrates an alternative embodiment of my air control unit 12 in which receiver 82, audio amplifier 84 and roll control channel 22 and pitch control channel 24 up to the inputs to the command tubes have exactly the same circuit elements as in my preferred embodiment which is shown in Figures 3 and 4. Also, the spare channel circuit elements of this alternative embodiment of my invention are the same as those used in the preferred embodiment of my invention.

The essential difference between the alternative embodiment of my invention shown in Figure 5 and the preferred embodiment of my invention shown in Figures 3 and 4 lies in the use of the command tubes.

Referring now to roll control channel 22 in my alternative embodiment, wave forms 110 and 112 are fed from integrating networks 106 and 108, respectively, into the inputs of the respective command tubes 334 and 336. Command tubes 334 and 336 are connected in series, in opposing relationship to each other, with servo-potentiometer 338 interposed between them. Although I prefer to connect the cathodes of tubes 334 and 336 to the opposite ends of servo-potentiometer 338, my alternative embodiment will also operate if the plates of tubes 334 and 336 are connected to the ends of potentiometer 338.

Command tubes 334 and 336, together with servo-potentiometer 338 form two legs of a bridge network, while gyro-potentiometer 340 provides the other two legs for this bridge network.

Command tubes 334 and 336 in my alternative embodiment function as variable resistors instead of as direct current amplifiers like command tubes 114 and 116 of my preferred embodiment. When wave form 36 in Figure 1 has equal positive and negative portions, waves 110 and 112 will provide equal signals to the inputs of command tubes 334 and 336, so that tubes 334 and 336 will present the same amount of resistance to the bridge network. If arms 342 and 344 of servo-potentiometer 338 and gyro-potentiometer 340, respectively, are centralized along potentiometer resistances 346 and 348, respectively, the bridge circuit is balanced so that polarized relay 350 is unactuated and roll-servo 352 remains stationary.

If arm 34 of potentiometer 30 in Figure 1 is moved to the right in the manner shown in Figure 1, wave 36 will have a relatively long positive portion and a relatively short negative portion so that wave 110 will be relatively positive and wave 112 will be relatively negative. This causes a decrease in the resistance of command tube 334 and an increase in the resistance of command tube 336, which upsets the previously perfect balance in the bridge circuit. This causes current to flow through relay 350 so that contact 354 of relay 350 will be made and roll servo 352 will so deflect ailerons 125 and 127 that the aircraft will roll to the right.

Mechanical linkage between roll servo 352 and arm 342 of servo-potentiometer 338 causes arm 342 to move to the right along potentiometer resistor 346 to re-establish a balance in the bridge network.

As soon as the aircraft rolls to the right, a relative displacement will be established between gyroscope 356 and the airframe which causes arm 344 to move to the right along gyro-potentiometer resistor 348. This causes an unbalance in the bridge network which is opposed to the previous unbalanced condition, so that contact 358 of polarized relay 350 will be made and roll servo 352 will return ailerons 125 and 127 to their normal, undeflected positions. At this time roll servo 352 will have moved arm 342 back to its central position along resistor 346 to re-establish the bridge balance.

This leaves the aircraft in a banked attitude, the angle of which is proportional to the amount of displacement of arm 34 to the right from its central position along resistor 32 of potentiometer 30 in Figure 1.

On the other hand, if arm 34 is moved to the left of the central position along resistor 32 in Figure 1, wave form 36 will have a relatively short positive portion and a relatively long negative portion which causes an increase in the resistance in tube 334 and a decrease in the resistance of tube 336 so that contact 358 of relay 350 will be made. Roll servo 352 will then deflect ailerons 125 and 127 to cause the aircraft to roll to the left, and at the same time will move arm 342 to the left along resistor 346 to re-establish the bridge balance. At the same time, relative displacement between gyroscope 356 and the airframe will move arm 344 to the left along resistor 348 which will cause an unbalance in the bridge network that makes contact 354 so that roll servo 352 will return ailerons 125 and 127 to their normal undeflected position. By the time roll servo 352 has rotated sufficiently to neutralize ailerons 125 and 127, arm 342 will be centralized along resistor 346 and the bridge network will again be balanced.

I provide as self-generated dither voltage in my alternative embodiment in substantially the same manner as in my preferred embodiment.

Pitch control channel 24 of my alternative embodiment operates in the same manner as roll control channel 22, command tubes 360 and 362, together with servo-potentiometer 364 forming two legs of the pitch control channel bridge network, and gyro-potentiometer 366 providing the other two legs for the bridge network.

Pitch servo 368 is operated by polarized relay 370 in the same manner that roll servo 352 was operated by relay 350. Pitch servo 368 is mechanically coupled with moveable arm 372 of servo-potentiometer 364, and moveable arm 374 of gyro-potentiometer 366 is mechanically connected to gyroscope 356.

Pitch control channel 24 is illustrated with arm 54 in Figure 1 moved to the left along resistor 52, which establishes the aircraft in a diving attitude.

Referring to Figure 2 of the drawings, the operator on the ground can place the aircraft in any attitude by the use of my control box 70 in the same manner as a pilot within the aircraft could place it in any attitude with the use of an automatic pilot.

When the aircraft is being flown in a level flight attitude, roll control knob 72 and pitch control knob 74 are both in the zero or neutral position. This centralizes potentiometer arms 34 and 54 along resistors 32 and 52, respectively, in Figure 1, so that waves 36 and 56 each have equal positive and negative portions. Correspondingly, equal signals are applied at the inputs of command tubes 114 and 116, and equal signals are applied to the inputs of command tubes 168 and 170. Thus, polarized relays 118 and 172 are unactuated, servos 124 and 178 leave the control surfaces and the respective arms 126 and 180 of servo potentiometers 130 and 184 in their neutral positions, and gyroscope 136 leaves arms 138 and 190 of gyro-potentiometers 142 and 194, respectively, in their neutral positions.

If it is desired to bank the aircraft to the right, roll control knob 72 is rotated to the right from the zero, or neutral position until arrow 376 on control box 70 indicates a desired angle of bank on dial 378 which forms an integral part of roll control knob 72. Thus, if a fifty (50°) degree bank to the right is desired, roll control knob 72 will be rotated to the right the amount shown in Figure 2.

Rotation of roll control knob 72 to the right moves arm 34 to the right in Figure 1, which causes an unequal signal to be applied to command tubes 114 and 116, which in turn causes roll servo 124 to roll the aircraft to the right. When the commanded angle of bank has been achieved by the aircraft, arm 138 of gyro-potentiometer 142 will have been moved to the right a sufficient amount to balance the bridge network so as to hold the aircraft in its banked attitude.

Since a given amount of rotation of roll control knob 72 from the neutral, or zero position will always cause a corresponding amount of bank of the aircraft, dial 378 may be accurately calibrated to produce an angle of bank of the aircraft which corresponds with the reading on dial 378.

In order to move the aircraft back to the level, or unbanked position, it is only necessary to rotate roll control knob 72 to the left until the zero on dial 378 is lined up with arrow 376. When this is done, the positive and negative portions of wave 36 are equal, so that integrating networks 106 and 108 provide equal inputs to command tubes 114 and 116. The lack of balance in the bridge network due to the right-hand positioning of arm 138 causes roll servo 124 to roll the aircraft to the left until arms 126 and 138 are both neutralized along resistors 128 and 140, and the aircraft is again in level flight.

If it is desired to bank the aircraft to the left, roll control knob 72 is merely rotated to the left until the desired degree of bank is indicated on dial 378 by arrow 376. The aircraft may again be established in a level flight attitude by rotating roll control knob 72 back to the right to its zero position.

By rotating pitch control knob 74 to the right from its zero, or neutral position, as indicated by arrow 380 on dial 382 of knob 74, the aircraft may be moved into a downward or diving attitude. The angle of this diving attitude from the horizontal is indicated on dial 382, so that if pitch control knob 74 is positioned as shown in Figure 2, the aircraft will be in approximately a twenty-five (25°) degree dive.

Conversely, movement of pitch control knob 74 to the left from its zero or neutral position will place the aircraft in an upward or climbing attitude, the angle of this attitude above the horizontal being indicated by arrow 380 on dial 382.

By having both dial 72 and dial 74 concurrently displaced from their zero positions, the aircraft may be placed in either a diving or a climbing turn.

Additional control knobs (not shown) may be provided on control box 70 if additional channels are employed in my pulse autopilot control system. Such additional channels can be used to control the aircraft rudder, trimmers, or any other movable part of the aircraft which will affect the flying attitude.

If it is desired to accurately control the direction of the aircraft with regard to azimuth and rate of turn, a third control channel (not shown) may be provided which is suitably connected to a rudder servo and to a gyroscope rotating about a horizontal axis.

However, I have found that the use of only two channels, roll control channel 22 and pitch control channel 24, provides sufficient control over the aircraft to use the craft as an aerial target, inasmuch as turning may be accomplished by merely banking the aircraft.

An important advantage of my pulse autopilot control system over the prior art is that the aircraft surfaces controlled by my control channels, may be so moved that the aircraft can be established in an infinite number of different attitudes. In contrast, prior art remote control automatic pilots could only place the aircraft in a designated number of stepped attitudes. Thus, my invention permits much more complete and accurate control over the aircraft than do prior art remote control automatic pilot systems. The ability to finely adjust variable width passive multivibrators 28 and 48 by roll control trim knob 76 and pitch control trim knob 78, respectively, permits placing the aircraft in any one of an infinite number of different attitudes of pitch and roll. Proper adjustment of trim knobs 76 and 78 will place the aircraft in accurate level flight when roll control knob 378 and pitch control knob 382 are both in the zero position. This will permit the calibrations of dials 378 and 382 to be relied on while controlling the attitude of the aircraft.

Another important advantage of my invention over the prior art remote control automatic pilot systems is that the aircraft attitude which I command through my control knobs 72 and 74 is achieved rapidly after I move knobs 72 and 74 to the desired positions. On the other hand, it was necessary for the operator of prior art remote control automatic pilot systems to wait for a step switch to go through a series of switching operations in order to place the aircraft in the desired attitude, so that the new attitude could not be rapidly attained.

Prior art remote control automatic pilot systems only utilized one channel over which both roll and pitch commands were conveyed. Thus, if a pitch command was given, a roll command could not be applied until the pitch command switching sequence was completed, and vice versa. On the other hand, the independence of my roll and pitch channels permits me to give simultaneous commands to both channels.

A still further advantage of my invention over prior art remote control automatic pilot systems is that if my carrier wave or either of my channel waves are lost, the one or two channels affected by this loss of signal will instantaneously have equal signals applied thereto through their integrating networks. This in turn will set the channel or channels involved for level flight of the aircraft. Thus, if the carrier fails or is interrupted both audio waves will be lost, so that the aircraft will be returned substantially to level flight. If the audio signal for channel 22 is lost, but the audio frequency signal is still present for channel 24, the aircraft will be returned to zero bank, but will remain at the commanded diving, or climbing attitude. Conversely, if the channel 24 audio signal is interrupted to employ the parachute or is lost and the channel 22 audio signal is present, the aircraft will be returned to the level pitch attitude, but will comply with bank commands.

In prior art remote control automatic pilot systems, if the carrier wave was lost, the aircraft remained in its last commanded attitude. Thus, if the craft were in a diving attitude close to the ground, it would continue to dive until it struck the earth if there were any delay in automatic deployment of the parachute.

If it is desired, spare channel on-off switch 66 may be placed on control box 70 in the manner shown in Figure 2. Also, a switch 384 may be placed on control box 70 to permit either the pitch channel audio oscillations or the R. F. carrier wave to be turned off so that parachute release 330 may be intentionally operated to release the parachute.

Although the operation of my ground control unit 10 is hereinabove described in connection with my pulse autopilot system, it is to be understood that it may also be used as the transmitter unit for a pulse proportional control system which utilizes proportion modulated channel signals.

It is to be understood that the form of my invention herein shown and described is my preferred embodiment and that various changes in the shape, size and arrangement of parts may be resorted to without departing from the spirit of my invention or the scope of the appended claims.

I claim:

1. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, integrating circuit means operatively connected to said signal frequency detector for providing a direct current command which varies substantially in proportion to the length of said variable length signal frequency pulses, relay means operatively connected to said integrating circuit means and operable in response to said direct current command, an operating mechanism adapted to change the attitude of said aircraft, said operating mechanism being operatively connected to said relay means and operable in response to said relay means, follow-up means operatively connected to said operating mechanism and to said integrating circuit means for reducing said direct current command when said operating mechanism moves in response to said command, and a gyroscope mounted on said aircraft and operatively connected to said integrating circuit means for further reducing said direct current command when the attitude of said aircraft is changed due to operation of said operating mechanism.

2. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, integrating circuit means operatively connected to said signal frequency detector for providing a direct current command which varies substantially in proportion to the length of said variable length signal frequency pulses, relay means operatively connected to said integrating circuit means and operable in response to said direct current command, an operating mechanism adapted to change the attitude of said aircraft, said operating mechanism being operatively connected to said relay means and operable in response to said relay means, said relay means being selectively movable by said direct current command between one position in which it causes actuation of said operating mechanism in one direction, and another position in which it causes actuation of said operating mechanism in the opposite direction, follow-up means operatively connected to said operating mechanism and to said integrating circuit means for reducing said direct current command when said operating mechanism moves in response to said command, and a gyroscope mounted on said aircraft and operatively connected to said integrating circuit means for further reducing said direct current command when the attitude of said aircraft is changed due to operation of said operating mechanism.

3. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, integrating circuit means operatively connected to said signal frequency detector for providing a direct current command which varies substantially in proportion to the length of said variable length signal frequency pulses, a polarized relay operatively connected to said integrating circuit means and selectively movable by said direct current command between opposed positions, an operating mechanism adapted to change the attitude of said aircraft, said operating mechanism being operatively connected to said relay and movable in one direction when said relay is in one of its opposed positions and in the other direction when said relay is in the other of its opposed positions, follow-up means operatively connected to said operating mechanism and to said integrating circuit means for reducing said direct current command when said operating mechanism moves in response to said command, and a gyroscope mounted on said aircraft and operatively connected to said integrating circuit means for further reducing said direct current command when the attitude of said aircraft is changed due to operation of said operating mechanism.

4. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, integrating circuit means operatively connected to said signal frequency detector for providing a direct current command which varies substantially in proportion to the length of said variable length signal frequency pulses, a polarized relay operatively connected to said integrating circuit means and selectively movable by said direct current command between opposed positions, an operating mechanism adapted to change the attitude of said aircraft, said operating mechanism being operatively connected to said relay and movable in one direction when said relay is in one of its opposed positions and the other direction when said relay is in the other of its opposed positions, said relay being at its balanced position when variable length signal frequency pulses have a time duration of substantially one-half of a full signal frequency cycle, follow-up means operatively connected to said operating mechanism and to said integrating circuit means for reducing said direct current command when said operating mechanism moves in response to said command, and a gyroscope mounted on said aircraft and operatively connected to said integrating circuit means for further reducing said direct current command when the attitude of said aircraft is changed due to operation of said operating mechanism.

5. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, a rectangular wave detector circuit operatively connected to said signal frequency detector, integrating circuit means operatively connected to said signal frequency detector for providing a direct current command which varies substantially in proportion to the ratio between the time durations of the positive and negative portions of the rectangular wave provided by said rectangular wave detector, relay means operatively connected to said integrating circuit means and selectively movable by said direct current command between opposed positions, an operating mechanism adapted to change the attitude of said aircraft, said operating mechanism being operatively connected to said relay means and movable in one direction when said relay means is in one of its opposed positions and in the other direction when said relay means is in the other of its opposed positions, follow-up means operatively connected to said operating mechanism and to said integrating circuit means for reducing said direct current command when said operating mechanism moves in response to said command, and a gyroscope mounted on said aircraft and operatively connected to said integrating circuit means for further reducing said direct current command when the attitude of said aircraft is changed due to operation of said operating mechanism.

6. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, a rectangular wave detector circuit operatively connected to said signal frequency detector, integrating circuit means operatively connected to said signal frequency detector for providing a direct current command which varies substantially in proportion to the ratio between the time durations of the positive and negative portions of the rectangular wave provided by said rectangular wave detector, relay means operatively connected to said integrating circuit means and selectively movable by said direct current command between opposed positions, an operating mechanism adapted to change the attitude of said aircraft, said operating mechanism being operatively connected to said relay means and movable in one direction when said relay means is in one of its opposed positions and in the other direction when said relay means is in the other of its opposed positions, said relay means being at a balance between its said opposed positions when said rectangular wave has substantially equal positive and negative portions, follow-up means operatively connected to said operating mechanism and to said integrating circuit means for reducing said direct current command when said operating mechanism moves in response to said command, and a gyroscope mounted on said aircraft and operatively connected to said integrating circuit means for further reducing said direct current command when the attitude of said aircraft is changed due to operation of said operating mechanism.

7. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, integrating circuit means operatively connected to said signal frequency detector for providing a pair of direct current commands which vary, respectively, substantially directly and inversely proportionally to the length of said variable length signal frequency pulses, relay means operatively connected to said integrating circuit means to provide the respective said direct current commands to opposite sides of said relay means whereby said relay means is movable to one position when one of said commands is greater than the other and movable to another position when the relative amplitude of said direct current commands is reversed, an operating mechanism adapted to change the attitude of said aircraft, said operating mechanism being operatively connected to said relay means and movable in one direction when said relay means is in one of its said positions and in the other direction when said relay means is in its other said position, follow-up means operatively connected to said operating mechanism and to said integrating circuit means for reducing said direct current commands when said operating mechanism moves in response to said commands, and a gyroscope mounted on said aircraft and operatively connected to said integrating circuit means for further reducing said direct current command when the attitude of said aircraft is changed due to operation of said operating mechanism.

8. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, integrating circuit means operatively connected to said signal frequency detector for providing a pair of direct current commands which vary, respectively, substantially directly and inversely proportionally to the length of said variable length signal frequency pulses, a pair of command tubes operatively connected to said integrating circuit means to provide the respective said direct current commands to the input members of the respective said command tubes, relay means having its opposite sides operatively connected to the output members of the respective said command tubes whereby said relay means is movable to one position when one of said direct current commands is greater than the other and movable to another position when the relative amplitude of said direct current commands is reversed, an operating mechanism adapted to change the attitude of said aircraft, said operating mechanism being operatively connected to said relay means and movable in one direction when said relay means is in one of its said positions and in the other direction when said relay means is in its other said position, follow-up means operatively connected to said operating mechanism and to said command tubes for reducing said direct current commands when said operating mechanism moves in response to said commands, and a gyroscope mounted on said aircraft and operatively connected to said command tubes for further reducing said direct current commands when the attitude of said aircraft is changed due to operation of said operating mechanism.

9. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, a rectangular wave detector circuit operatively connected to said signal frequency detector, integrating circuit means operatively connected to said rectangular wave detector for providing a pair of direct current commands, one of which varies substantially in proportion to the time duration of the positive portion of said rectangular wave and the other of which varies substantially in proportion to the time duration of the negative portion of said rectangular wave, relay means operatively connected to said integrating circuit means to provide the respective said direct current commands to opposite sides of said relay means whereby said relay means is movable to one position when one of said direct current commands is greater than the other and movable to another position when the relative amplitudes of said direct current commands are reversed, an operating mechanism adapted to change the attitude of said aircraft, said operating mechanism being operatively connected to said relay means and movable in one direction when said relay means is in one of its said positions and in the other direction when said relay means is in its other said position, follow-up means operatively connected to said operating mechanism and to said integrating circuit means for reducing said direct current commands when said operating mechanism moves in response to said commands, and a gyroscope mounted on said aircraft and operatively connected to said integrating circuit means for further reducing said direct current commands when the attitude of said aircraft is changed due to operation of said operating mechanism.

10. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, a rectangular wave detector circuit operatively connected to said signal frequency detector, integrating circuit means operatively connected to said rectangular wave detector for providing a pair of direct current commands, one of which varies substantially in proportion to the time duration of the positive portion of said rectangular wave and the other of which varies substantially in proportion to the time duration of the negative portion of said rectangular wave, a pair of command tubes operatively connected to said integrating circuit means to provide the respective said direct current commands to the input members of the respective said command tubes, relay means having its opposite sides operatively connected to the output members of the respective said command tubes whereby said relay means is movable to one position when one of said direct current commands is greater than the other and movable to another position when the relative amplitudes of said direct current commands are reversed, an operating mechanism adapted to change the attitude of said aircraft, said operating mechanism being operatively connected to said relay means and movable in one direction when said relay means is in one of its said positions and in the other direction when said relay means is in its other said position, follow-up means operatively connected to said operating mechanism and to said command tubes for reducing said direct current commands when said operating mechanism moves in response to said commands, and a gyroscope mounted on said aircraft and operatively connected to said command tubes for further reducing said direct current commands when the attitude of said aircraft is changed due to operation of said operating mechanism.

11. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, a limiter tube operatively connected to said signal frequency detector for limiting the amplitude if the detected wave, integrating circuit means operatively connected to said limiter tube for providing a direct current command which varies substantially in proportion to the length of said variable length signal frequency pulses, relay means operatively connected to said integrating circuit means and operable in response to said direct current command, an operating mechanism adapted to change the attitude of said aircraft, said operating mechanism being operatively connected to said relay means and operable in response to said relay means, follow-up means operatively connected to said operating mechanism and to said integrating circuit means for reducing said direct current command when said operating mechanism moves in response to said command, and a gyroscope mounted on said aircraft and operatively connected to said integrating circuit means for further reducing said direct current command when the attitude of said aircraft is changed due to operation of said operating mechanism.

12. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, a limiter tube operatively connected to said signal frequency detector for limiting the amplitude of the detected wave, integrating circuit means operatively connected to said limiter tube for providing a direct current command which varies substantially in proportion to the length of said variable length signal frequency pulses, relay means operatively connected to said integrating circuit means and operable in response to said direct current command, an operating mechanism adapted to change the attitude of said aircraft, said operating mechanism being operatively connected to said relay means and operable in response to said relay means, said relay means being selectively movable by said direct current command between one position in which it causes actuation of said operating mechanism in one direction and another position in which it causes actuation of said operating mechanism in the opposite direction, follow-up means operatively connected to said operating mechanism and to said integrating circuit means for reducing said direct current command when said operating mechanism moves in response to said command, and a gyroscope mounted on said aircraft and operatively connected to said integrating circuit means for further reducing said direct current command when the attitude of said aircraft is changed due to operation of said operating mechanism.

13. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, a rectangular wave detector operatively connected to said signal frequency detector, a limiter tube operatively connected to said signal frequency detector for limiting the amplitude of said rectangular wave, integrating circuit means operatively connected to said limiter tube for providing a direct current command which varies substantially in proportion to the ratio between the time durations of the positive and negative portions of the rectangular wave provided by said rectangular wave detector, relay means operatively connected to said integrating circuit means and selectively movable by said direct current command between opposed positions, an operating mechanism adapted to change the attitude of said aircraft, said operating mechanism being operatively connected to said relay means and movable in one direction when said relay means is in one of its opposed positions and in the other direction when said relay means is in the other of its opposed positions, follow-up means operatively connected to said operating mechanism and to said integrating circuit means for reducing said direct current command when said operating mechanism moves in response to said command, and a gyroscope mounted on said aircraft and operatively connected to said integrating circuit means for further reducing said direct current command when the attitude of said aircraft is changed due to operation of said operating mechanism.

14. In an aircraft, an autopilot system for controlling the attitude of the aircraft, said autopilot system utilizing a carrier frequency modulated with a plurality of signal frequency waves each of which comprises variable length signal frequency pulses of substantially constant pulse repetition rate, a receiver unit mounted on said aircraft and forming a part of said autopilot system, said receiver unit including a signal frequency detector circuit, filter means associated with each channel operatively connected to said signal frequency detector to isolate the respective said signal frequency waves, integrating circuit means operatively connected to the said filter means of each channel for providing a direct current command in each channel which varies substantially in proportion to the length of said variable length signal frequency pulses in the respective channel, relay means operatively connected to said integrating circuit means in each channel and operable in response to said direct current command in the respective channel, an operating mechanism for each channel adapted to change the attitude of said aircraft, each of said operating mechanisms being operatively connected to the respective said relay means in each channel and operable in response to the respective said relay means, follow-up means operatively connected to the respective said operating mechanism and to the respective said integrating circuit means in each channel for reducing the respective said direct current command when said operating mechanism moves in response to said command, and a gyroscope mounted on said aircraft and operatively connected to said integrating circuit means in each channel for further reducing the respective said direct current command when the attitude of said aircraft is changed due to operation of the respective said operating mechanism.

15. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, integrating circuit means operatively connected to said signal frequency detector for providing a direct current command which varies substantially in proportion to the length of said variable length signal frequency pulses, relay means operatively connected to said integrating circuit means and operable in response to said direct current command, an operating mechanism adapted to change the attitude of said aircraft, said operating mechanism being operatively connected to said relay means and operable in response to said relay means, follow-up means operatively connected to said operating mechanism and to said integrating circuit means for reducing said direct current command when said operating mechanism moves in response to said command, said integrating circuit means including circuit elements for passing a small amplitude of the pulse frequency oscillations to provide a dither voltage to said relay to substantially eliminate the dead zone of the relay, and a gyroscope mounted on said aircraft and operatively connected to said integrating circuit means for further reducing said direct current command when the attitude of said aircraft is changed due to operation of said operating mechanism.

16. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, integrating circuit means operatively connected to said signal frequency detector for providing a direct current command which varies substantially in proportion to the length of said variable length signal frequency pulses, relay means operatively connected to said integrating circuit means and operable in response to said direct current command, an operating mechanism adapted to change the attitude of said aircraft, said operating mechanism being operatively connected to said relay means and operable in response to said relay means, said relay means being selectively movable by said direct current command between one position in which it causes actuation of said operating mechanism in one direction and another position in which it causes actuation of said operating mechanism in the opposite direction, follow-up means operatively connected to said operating mechanism and to said integrating circuit means for reducing said direct current command when said operating mechanism moves in response to said command, said integrating circuit means including circuit elements for passing a small amplitude of the pulse frequency oscillations to provide a dither voltage to said relay to substantially eliminate the dead zone of said relay in movements between its said two positions, and a gyroscope mounted on said aircraft and operatively connected to said integrating circuit means for further reducing said direct current command when the attitude of said aircraft is changed due to operation of said operating mechanism.

17. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, integrating circuit means operatively connected to said signal frequency detector for providing a pair of direct current commands which vary, respectively, substantially directly and inversely proportionally to the length of said variable length signal frequency pulses, a pair of command tubes operatively connected to said integrating circuit means to provide the respective said direct current commands to the control grids of the respective command tubes, relay means having its respective opposite sides operatively connected to the same primary tube element of the respective said command tubes whereby said relay means is movable to one position when one of said direct current commands is greater than the other and movable to another position when the relative amplitudes of said direct current commands are reversed, an operating mechanism adapted to change the attitude of said aircraft, said operating mechanism being operatively connected to said relay means and movable in one direction when said relay means is in one of its said positions and in the other direction when said relay means is in its other said position, follow-up means including a potentiometer operatively connected to and actuated by said operating mechanism and having its opposite ends operatively connected to the respective said control grids for reducing said commands when said operating mechanism moves in response to said commands, and a gyroscope mounted on said aircraft and operatively connected to said command tubes for further reducing said direct current commands when the attitude of said aircraft is changed due to operation of said operating mechanism.

18. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, integrating circuit means operatively connected to said signal frequency detector for providing a pair of direct current commands which vary, respectively, substantially directly and inversely proportionally to the length of said variable length signal frequency pulses, a pair of command tubes operatively connected to said integrating circuit means to provide the respective said direct current commands to the control grids of the respective said command tubes, relay means having its respective opposite sides operatively connected to the plates of the respective said command tubes whereby said relay means is movable to one position when one of said direct current commands is greater than the other and movable to another position when the relative amplitudes of said direct current commands are reversed, an operating mechanism adapted to change the attitude of said aircraft, said operating mechanism being operatively connected to said relay means and movable in one direction when said relay means is in one of its said positions and in the other direction when said relay means is in its other said position, follow-up means including a potentiometer operatively connected to and actuated by said operating mechanism and having its opposite ends operatively connected to the respective said control grids for reducing said commands when said operating mechanism moves in response to said commands, and a gyroscope mounted on said aircraft and operatively connected to said command tubes for further reducing said direct current commands when the attitude of said aircraft is changed due to operation of said operating mechanism.

19. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, integrating circuit means operatively connected to said signal frequency detector for providing a pair of direct current commands which vary, respectively, substantially directly and inversely proportionally to the length of said variable length signal frequency pulses, a pair of command tubes operatively connected to said integrating circuit means to provide the respective said direct current commands to the control grids of the respective command tubes, relay means having its respective opposite sides operatively connected to the same primary tube element of the respective said command tubes whereby said relay means is movable to one position when one of said direct current commands is greater than the other and movable to another position when the relative amplitudes of said direct current commands are reversed, an operating mechanism adapted to change the attitude of said aircraft, said operating mechanism being operatively connected to said relay means and movable in one direction when said relay means is in one of its said positions and in the other direction when said relay means is in its other said position, follow-up means including a potentiometer operatively connected to and actuated by said operating mechanism and having its opposite ends operatively connected to the respective said control grids for reducing said commands when said operating mechanism moves in response to said commands, said operative connections between said potentiometer and said control grids having a low impedance for relatively high rates of voltage change in order to provide an anticipation control, and a gyroscope mounted on said aircraft and operatively connected to said command tubes for further reducing said direct current commands when the attitude of said aircraft is changed due to operation of said operating mechanism.

20. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, integrating circuit means operatively connected to said signal frequency detector for providing a pair of direct current commands which vary, respectively, substantially directly and inversely proportionally to the length of said variable length signal frequency pulses, a pair of command tubes operatively connected to said integrating circuit means to provide the respective said direct current commands to the control grids of the respective said command tubes, relay means having its respective opposite sides operatively connected to the same primary tube element of the respective said command tubes whereby said relay means is movable to one position when one of said direct current commands is greater than the other and movable to another position when the relative amplitudes of said direct current commands are reversed, an operating mechanism adapted to change the attitude of said aircraft, said operating mechanism being operatively connected to said relay means and movable in one direction when said relay means is in one of its said positions and in the other direction when said relay means is in its other said position, follow-up means including a potentiometer operatively connected to and actuated by said operating mechanism and having its opposite ends operatively connected to the other primary tube element of the respective said command tubes for reducing said commands when said operating mechanism moves in response to said commands, and a gyroscope mounted on said aircraft and operatively connected to said command tubes for further reducing said direct current commands when the attitude of said aircraft is changed due to operation of said operating mechanism.

21. In an aircraft, an autopilot system for controlling the attitude of the aircraft, said autopilot system utilizing a carrier frequency modulated with variable length signal frequency pulses of substantially constant pulse repetition rate, a receiver unit mounted on said aircraft and forming a part of said autopilot system, said receiver unit including a signal frequency detector circuit, integrating circuit means operatively connected to said signal frequency detector for providing a pair of direct current commands which vary, respectively, substantially directly and inversely proportionally to the length of said variable length signal frequency pulses, a pair of command tubes operatively connected to said integrating circuit means to provide the respective said direct current commands to the control grids of the respective said command tubes, relay means having its respective opposite sides operatively connected to the plates of the respective said command tubes whereby said relay means is movable to one position when one of said direct current commands is greater than the other and movable to another position when the relative amplitudes of said direct current commands, is reversed, an operating mechanism adapted to change the attitude of said aircraft, said operating mechanism being operatively connected to said relay means and movable in one direction when said relay means is in one of its said positions and in the other direction when said relay means is in its other said position, follow-up means including a potentiometer operatively connected to and actuated by said operating mechanism and having its opposite ends operatively connected to the cathodes of the respective said command tubes for reducing said commands when said operating mechanism moves in response to said commands, and a gyroscope mounted on said aircraft and operatively connected to said command tubes for further reducing said direct current commands when the attitude of said aircraft is changed due to operation of said operating mechanism.

References Cited in the file of this patent

UNITED STATES PATENTS

| Number | Name | Date |
|---|---|---|
| 2,266,401 | Reeves | Dec. 16, 1941 |
| 2,387,795 | Isserstedt | Oct. 30, 1945 |
| 2,393,892 | De Ganahl | Jan. 29, 1946 |
| 2,419,025 | Mercer | Apr. 15, 1947 |
| 2,441,568 | Finison | May 18, 1948 |
| 2,441,963 | Gray | May 25, 1948 |
| 2,464,629 | Young | Mar. 15, 1949 |
| 2,466,702 | Hamby | Apr. 12, 1949 |
| 2,490,844 | Sorensen | Dec. 13, 1949 |
| 2,515,254 | Nosker | July 18, 1950 |
| 2,548,278 | Wirkler | Apr. 10, 1951 |
| 2,565,540 | Williams | Aug. 28, 1951 |
| 2,575,890 | Perkins et al. | Nov. 20, 1951 |
| 2,602,611 | Glenny | July 8, 1952 |
| 2,603,434 | Merrill | July 15, 1952 |
| 2,636,699 | Jude et al. | Apr. 28, 1953 |

OTHER REFERENCES

Welge: "Radio Control of Model Flying Boats," Proceedings of the I. R. E., vol. 5, No. 5, pp. 526–530, May 1947.